May 19, 1964 J. L. CHRISTMANN 3,133,605
MEANS FOR SUSPENDING A SCALE CONVEYOR
Filed Jan. 22, 1963 5 Sheets-Sheet 1
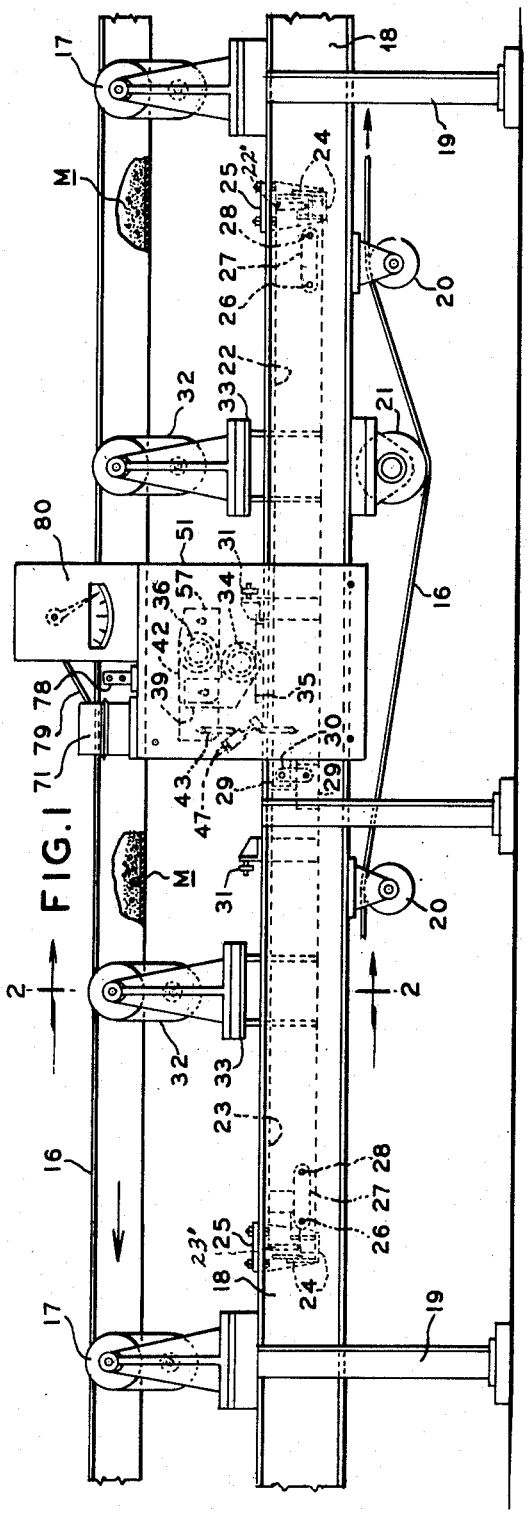
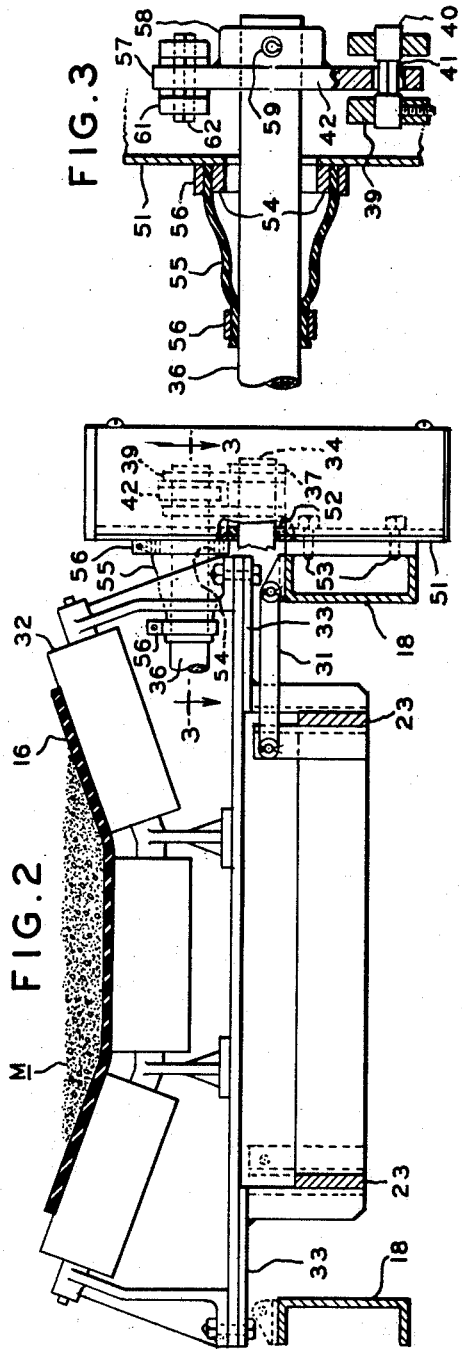
INVENTOR
JOHN L. CHRISTMANN
BY
John A. Seifert
ATTORNEY May 19, 1964  J. L. CHRISTMANN  3,133,605
MEANS FOR SUSPENDING A SCALE CONVEYOR
Filed Jan. 22, 1963  5 Sheets-Sheet 2

INVENTOR
JOHN L. CHRISTMANN
BY John A. Seifert
ATTORNEY

May 19, 1964 J. L. CHRISTMANN 3,133,605
MEANS FOR SUSPENDING A SCALE CONVEYOR
Filed Jan. 22, 1963 5 Sheets-Sheet 3
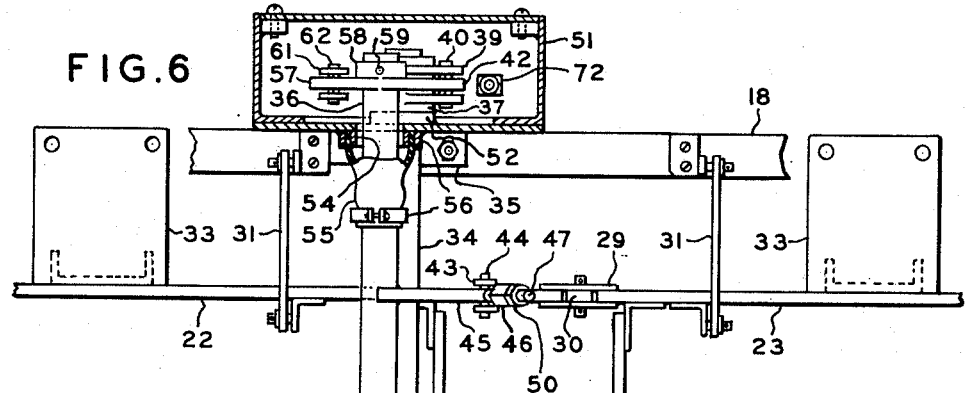
FIG. 6
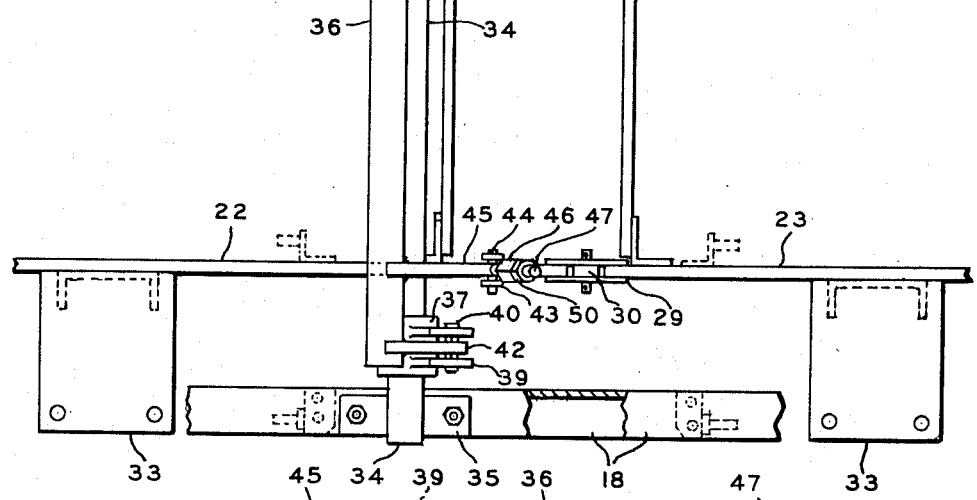
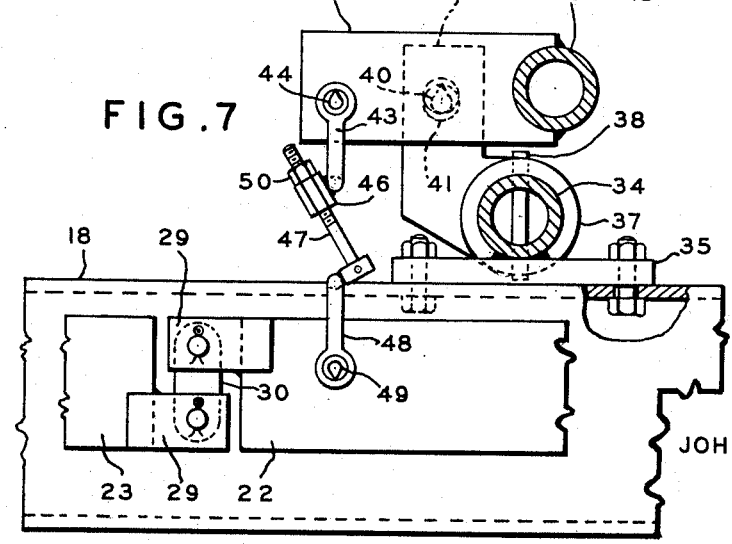
FIG. 7
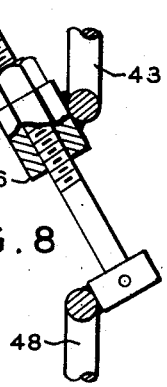
FIG. 8
INVENTOR
JOHN L. CHRISTMANN
BY John A. Seifert
ATTORNEY May 19, 1964  J. L. CHRISTMANN  3,133,605
MEANS FOR SUSPENDING A SCALE CONVEYOR
Filed Jan. 22, 1963  5 Sheets-Sheet 4

INVENTOR
JOHN L. CHRISTMANN
BY John A. Seifert
ATTORNEY

May 19, 1964  J. L. CHRISTMANN  3,133,605
MEANS FOR SUSPENDING A SCALE CONVEYOR
Filed Jan. 22, 1963  5 Sheets-Sheet 5

INVENTOR
JOHN L. CHRISTMANN
BY John A. Seifert
ATTORNEY

United States Patent Office 3,133,605
Patented May 19, 1964

3,133,605
MEANS FOR SUSPENDING A SCALE CONVEYOR
John L. Christmann, Passaic County, N.J., assignor to Merrick Scale Mfg. Company, Passaic, N.J., a corporation of New Jersey
Filed Jan. 22, 1963, Ser. No. 253,213
2 Claims. (Cl. 177—16)

This invention relates to a conveyor scale suspension system whereby the load on a traveling conveyor is transmitted to a count register totalizing the weight of material conveyed.

It is an object of the invention to support the entire suspension system by a single member adjustably mounted on stringers forming part of the supporting structure of the conveyor.

It is another object of the invention to mount a load sensing element and levers transmitting the load to said sensing element in a cabinet supported by said single member on the side of the conveyor thereby eliminating overhead structure extending across the conveyor and protecting the levers from dust.

It is another object of the invention to use either a single idler suspension frame or a multiple idler suspension frame.

It is another object of the invention to vary the lever ratios to suit the loads conveyed thereby permitting the use of the same capacity load sensing element.

Another object of the invention is to adjustably support the single member on the stringers whereby the relative positions of the levers and the load sensing element are maintained regardless of the inclination of the stringers and the conveyor.

It is a further object of the invention to use different load sensing elements, such as strain gages, hydraulic or pneumatic load cells or calibrated springs without requiring major changes in the suspension system.

Further objects and advantages of the invention will be set forth in the detailed description of the invention.

In the drawings accompanying and forming a part of this application:

FIGURE 1 is an elevational view of the embodiment of the invention applied to a scale conveyor having a multiple idler suspension frame;

FIGURE 2 is a cross-section, on an enlarged scale, taken on the line 2—2 of FIGURE 1 looking in the direction of the arrows;

FIGURE 3 is a sectional view, on an enlarged scale, taken on the line 3—3 of FIGURE 2 looking in the direction of the arrows;

FIGURE 6 is a top view, partly in section, looking from the line 6—6 of FIGURE 5 in the direction of the arrows;

FIGURE 7 is a sectional view, on an enlarged scale, taken on the line 7—7 of FIGURE 5 looking in the direction of the arrows;

FIGURE 8 is a side view, partly in section and on an enlarged scale, of an adjustable member of a rod connecting the main lever to a suspension frame shown in FIGURE 7;

Figure 4:
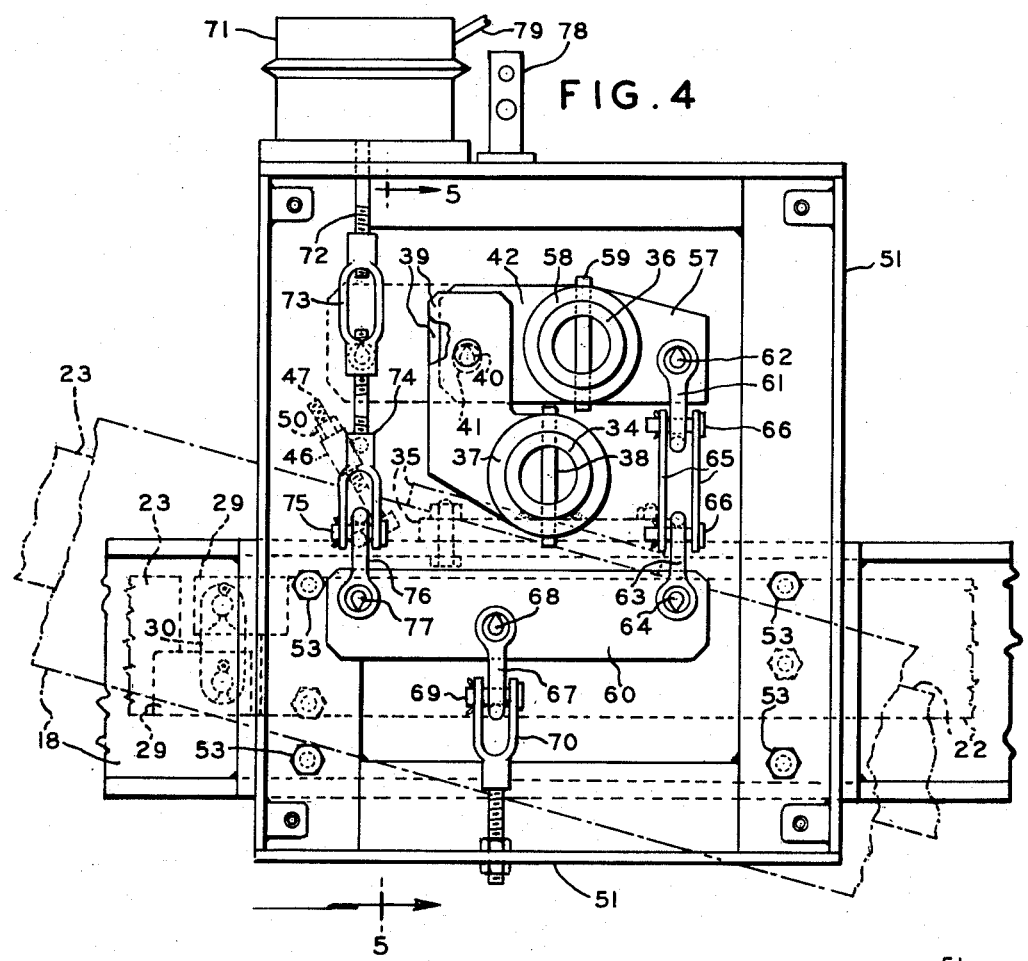
FIGURE 4 is an elevational view of component parts of the invention showing the stable relative position of parts regardless of the angle of inclination of the stringers and the conveyor.

The embodiment of the invention is illustrated in connection with an endless belt 16 having the upper stretch supported by idlers 17 mounted on stringers 18 supported at a desired angle by standards 19. The lower stretch of the belt 16 travels over idlers 20 and under a tension idler 21 supported at the bottoms of the stringers 18, as shown in FIGURE 1. The idlers 17 consist of three rollers with the middle roller on a horizontal axis and the outer rollers on axes inclining from the horizontal axis to support the upper stretch in a trough formation, as shown in FIGURE 2, and on which material $m$ is transported.

A predetermined portion of the upper stretch of the belt 16 is supported by a suspension frame. In FIGURES 1 to 9, inclusive, the suspension frame carries more than one idler, and in FIGURES 10, 11, 13 and 14, the suspension frame carries one idler.

Figure 15:
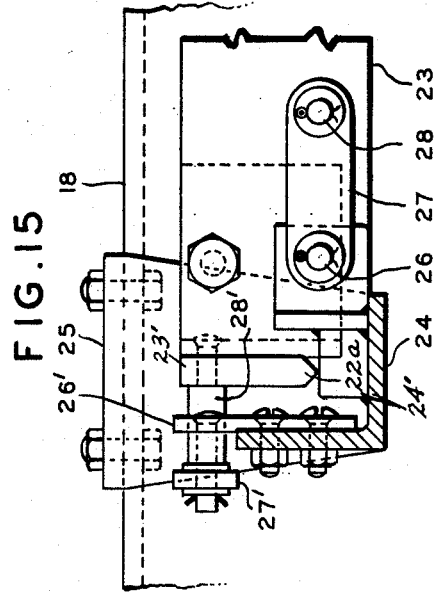
FIGURE 15 is a side view of the suspension frame shown in FIGURES 1 to 9, inclusive, to show means to steady the suspension frame.

The suspension frame of FIGURES 1 to 9, inclusive, and 15 comprises two rectangular sections 22 and 23, section 22 constituting the approach section and section 23 being the retreat section, in the present illustration. Both sections are supported between the stringers 18 by transverse brackets 24 having the opposite ends secured to the stringers 18, as at 25 in FIGURES 1 and 15, and pivots 26 supporting one end of longitudinal drag links 27 having the opposite ends connected to pivots 28 on the sections 22 and 23 as shown in FIGURES 1 and 15. A transversal drag link 27' is provided at the distant end of each section 22 and 23, each link having one end pivoted on a plate 26' secured in the center of each transverse bracket 24 and the opposite end pivoted on an end member 22' and 23' of each section 22 and 23, respectively, adjacent to a side member of each section, as at 28' in FIGURE 15. The end members 22' and 23' of each section 22 and 23, respectively, are provided with a knife-edge 22a engaging a block 24' fixed on the transverse brackets 24, as shown in FIGURE 15. The adjacent ends of the sections 22 and 23 are provided with parallel ears 29 connected together by links 30, as shown in FIGURES 1, 4, 6, 7 and 9. To further stabilize the frame sections 22 and 23, links 31 are pivotally connected at the ends to either of the stringers 18 and the adjacent side of each of the frame sections 22 and 23, as shown in FIGURES 1, 2 and 6, depending on the assembly of parts as fully described hereinafter. As shown in the present illustration, each of the frame sections 22 and 23 support an idler 32 consisting of three rollers in the same manner as the idlers 17. Each of said idlers 32 is mounted on platforms 33 projecting laterally from the sections 22 and 23, as shown in FIGURES 1, 2 and 6.

The present invention resides in connecting the suspension frame to means for transmitting the load component of the product of the load and the speed of the conveyor to an integrator operating a count register totalizing the weight of material $m$.

Figure 12:
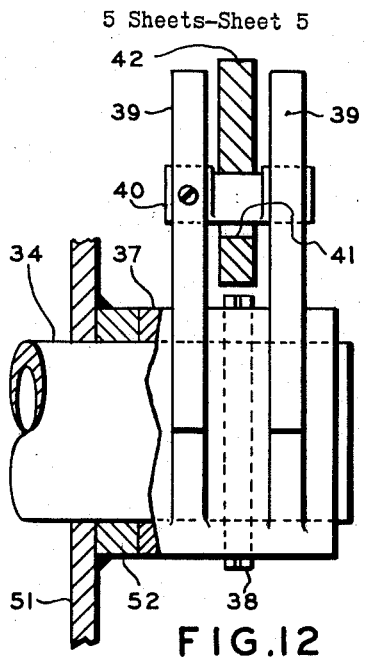
FIGURE 12 is a fragmentary view of a supporting connection between the single member and main lever.
Figure 10:
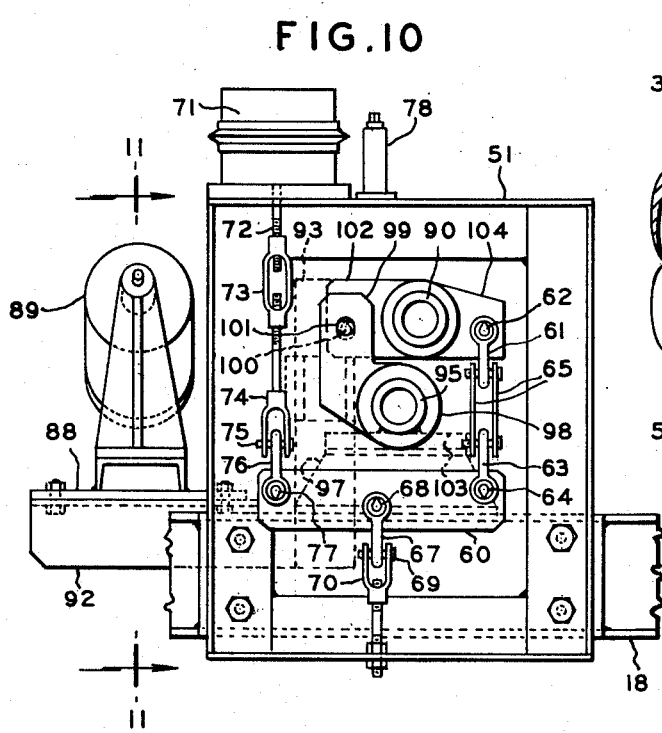
FIGURE 10 is a view similar to FIGURE 4 showing the invention associated with a single idler suspension frame.
Figure 11:
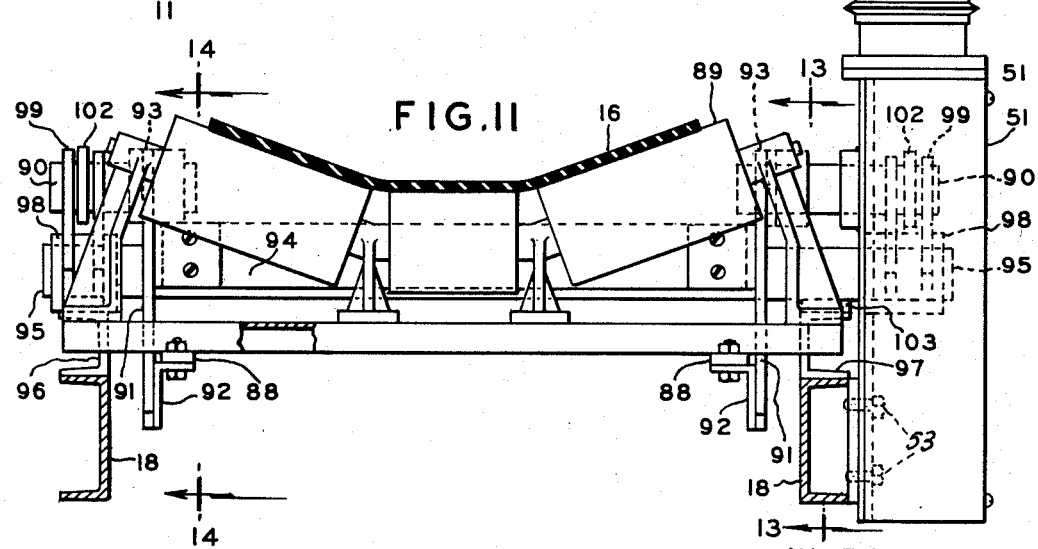
FIGURE 11 is a cross-sectional view taken on the line 11—11 of FIGURE 10 looking in the direction of the arrows.

In FIGURES 1 to 9, inclusive, said connection comprises a transverse member 34 in the form of a tube having the opposite end portions secured to flat members or plates 35 bolted to the stringers 18. The plates 35 are secured to the transverse member 34 by welding at an angle depending on and coinciding with the inclination of the stringers 18, as shown in FIGURE 4, so that the component parts of the connection extend in fixed planes relative to each other regardless of the inclination of the conveyor 16 and the stringers 18. A main lever 36 in the form of a tubing is pivotally supported by the transverse member 34 through fulcrum brackets, each bracket comprising a collar 37 fixed to the transverse member by a roll pin 38 and a pair of spaced arms 39 extending from the collar 37 in an oblique direction with the major portion of said arms extending in vertical planes. Each pair of arms 39 is provided with a fulcrum pin 40 having the ends fixed in said arms 39 and a knife-edged portion engaging an opening 41 in an arm of a pair of arms 42 fixed to and extended laterally from the main lever 36 between the arms 39, as shown in FIGURES 3 and 12. The main lever 36 is pivotally and adjustably connected to the suspension frame sections 22 and 23 by suspension rods comprising a clevis 43 pivotally engaging end portions of a pin 44 having a knife edge at said end portions and extending from the sides of an arm of a pair of arms 45 secured to and extended laterally from the main lever 36 in vertical alignment with the frame sections 22 and 23. Each of the clevises 43 is secured to a nut 46 adjustably mounted on a bolt 47 having the head secured to a clevis of a pair of clevises 48 pivotally connected to the end portions of a knife edged pin 49 fixed in each of the side members of the frame section 22 with the end portions of the pin extended from the sides of said members. The nuts are retained in adjusted position by lock nuts 50. The main lever ratio is varied by changing the distance between the center of the main lever 36 and the pins 44. As clearly shown in FIGURES 1 and 2, the transverse member 34 and the main lever 36 are positioned below the upper stretch of the belt 16 carrying the material m.

Figure 5:
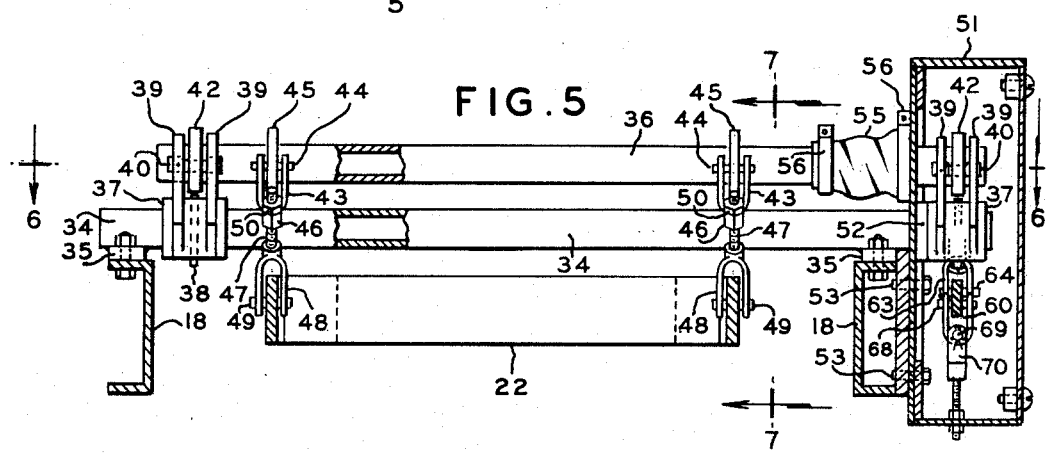
FIGURE 5 is a cross-sectional view, on a reduced scale, taken on the line 5—5 of FIGURE 4 looking in the direction of the arrows.

Corresponding end portions of the transverse member 34 and the main lever 36 are extended beyond one of the stringers 18 and said end portions are enclosed by a cabinet 51 having the rear wall adjacent said stringer and secured to the transverse member 34 by a hub 52 secured to said transverse member 34 and the rear wall, as shown in FIGURES 6 and 12. The cabinet 51 is further supported by the adjacent stringer 18 by bolts 53, as shown in FIGURES 2 and 5. The main lever 36 is extended into the cabinet 51 through a hub 54 on the outer surface of the rear wall of said cabinet and of larger diameter than the main lever, as shown in FIGURE 3. To prevent dirt and dust from entering the cabinet 51 through the space between the main lever 36 and the hub 54, a flexible sleeve 55 is provided having the opposite end portions clamped to the main lever and the hub by clamping rings 56, as shown in FIGURES 2, 3, 5 and 6. One of the pairs of fulcrum brackets 37, 38, 39, 40 and one of the pair of arms 42 are enclosed in the cabinet. The end portion of the main lever 36 within the cabinet 51 is provided with an arm 57 extending from the main lever in alignment with the arm 42 and in a direction opposite to the direction in which the arm 42 extends from the main lever, as shown in FIGURES 1, 4 and 6. In the present illustration of the invention, arms 42 and 57 are of one piece and mounted on the main lever by a collar 58 secured to said piece as by welding and to the main lever by a roll pin 59, as shown in FIGURES 3, 4 and 6.

Figure 9:
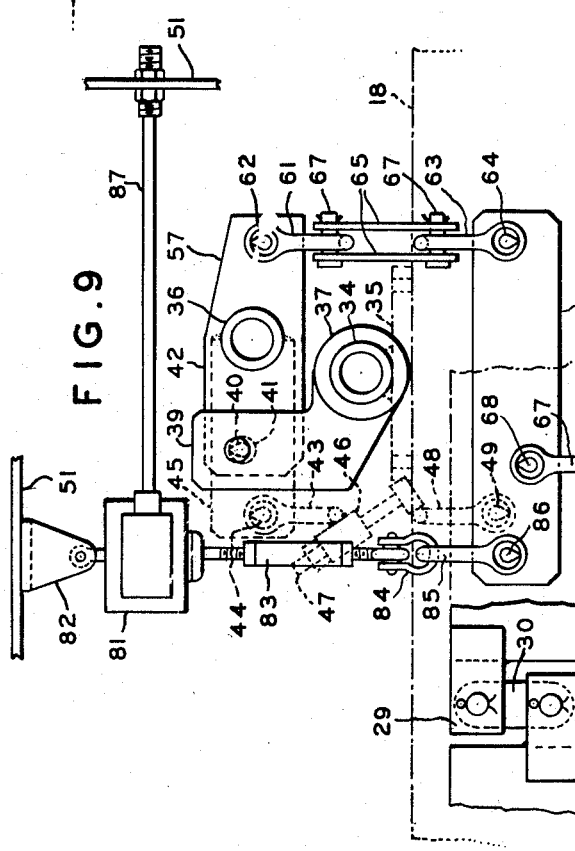
FIGURE 9 is a view similar to FIGURE 4 with the cabinet partly shown and a strain gage substituted for a hydraulic load cell shown in FIGURE 4.

The arm 57 is connected to an intermediate lever 60 by linkage comprising a clevis 61 mounted on the opposite end portions of a knife-edged pin 62 secured in the arm 57 with the opposite end portions of said pin 62 extending from the sides of said arm 57 and a clevis 63 mounted on the opposite end portions of a knife-edged pin 64 secured in an end portion of the intermediate lever 60 with the opposite end portions of said pin 64 extending from the sides of said intermediate lever. The clevises 61 and 63 are connected together by a pair of links 65 having the opposite ends pivoted on pins 66 carried by the clevises 61 and 63, as shown in FIGURES 4 and 9. The intermediate lever 60 is supported from the bottom wall of the cabinet 51 by a clevis 67 mounted on the opposite end portions of a knife-edged pin 68 secured in an intermediate portion of the intermediate lever 60 with the opposite end portions extending from the sides of said intermediate lever. The clevis 67 is engaged by a transverse pin 69 secured in a yoke member 70 adjustably mounted in the bottom wall of the cabinet 51. The intermediate lever ratio is varied by moving the yoke member 70, as shown in FIGURES 4 and 9.

The end portion of the intermediate lever 60 opposite the end portion connected to the arm 57 is connected to a load sensing element. In FIGURES 1 and 4, said load sensing element is shown as a hydraulic load cell 71 mounted on the exterior of the top wall of the cabinet and having a rod 72 extended into the cabinet and adjustably connected to a turnbuckle 73 adjustably connected to a yoke member 74 having a transverse pin 75 supporting a clevis 76 engaging the opposite end portions of a knife-edged pin 77 secured in the opposite end portion of the intermediate lever 60. The fluid in the hydraulic system is replenished through a filling valve 78 and the pressure in the hydraulic load cell 71 is transmitted through tubing 79 to an instrument 80 which indicates the pressure and transduces it for remote integration, not shown.

In FIGURE 9, the load sensing element is shown as consisting of a strain gage 81 supported from the interior of the top wall of the cabinet 51 by a bracket 82. The strain gage 81 is provided with a turnbuckle 83 connected to a yoke 84 connected to a clevis 85 engaging the end portions of a knife-edged pin 86 secured in the opposite end portion of the intermediate lever 60 with the end portions of the pin extending from the sides of said lever 60. The strain gage 81 is connected to an integrator, not shown, by electric cables passed through a conduit 87 supported in the cabinet 51.

The pivots 28' for the transversal drag links 27' are mounted on the end members 22' and 23' near the side members of the sections 22 and 23 which extend adjacent to the stringer 18 connected to the cabinet, and the stabilizing links 31 are connected to the same stringer 18, so that the elements within said cabinet will not be disturbed by the travel of the conveyor.

Figure 13:
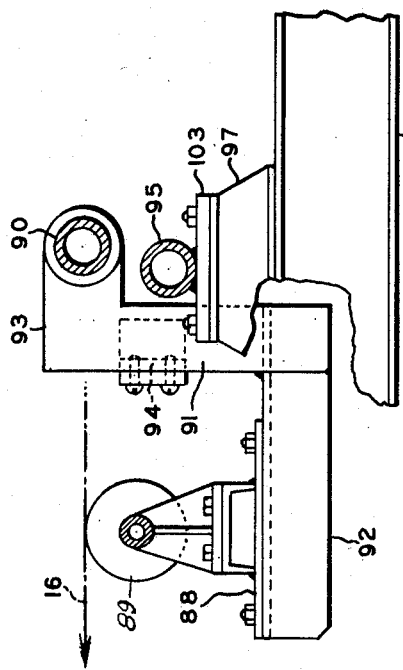
FIGURE 13 is a sectional view taken on the line 13—13 of FIGURE 11 looking in the direction of the arrows.
Figure 14:
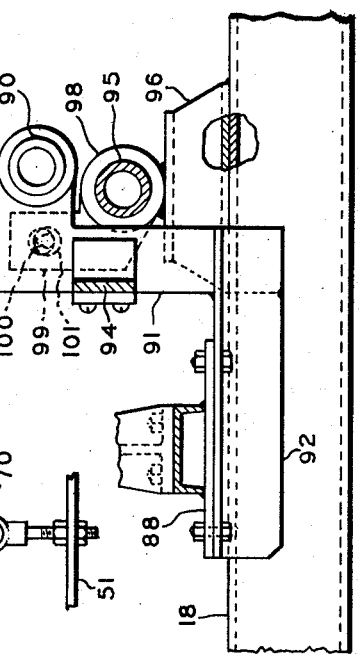
FIGURE 14 is a sectional view taken on the line 14—14 of FIGURE 11 looking in the direction of the arrows.

FIGURES 10, 11, 13 and 14 show the manner of adapting the inventive concept of the transverse member 34, the main lever 36 and the intermediate lever 60 to a suspension frame carrying one idler. This is accomplished by a platform 88 provided with an idler 89 formed in the same manner as the idlers 32. The platform 88 is suspended by a pair of stub tubings 90 representing the main lever 36 of FIGURES 1 to 9, inclusive. The tubing 90 are connected to the platform 88 by a pair of angle brackets, each bracket comprising a vertical leg portion 91 connected to one end of a horizontal beam 92 secured to the platform 88 adjacent each side thereof and a horizontal leg portion 93 secured to each of the stub tubings 90. The brackets 91, 93 are reinforced by a tie-bar 94. The stub tubings 90 are pivotally supported in the same manner as the main lever 36 by a transverse member 95 having the opposite end portions supported by the stringers on blocks 96 and 97. The transverse member 95 is connected to the stub tubings 90 by a pair of fulcrum brackets, each bracket including a collar 98 secured on each end portion of the transverse member 95 in the same manner as the collars 37 on the transverse member 34, and a pair of spaced arms 99 having a transverse knife-edged pin 100 extended through an opening 101 in an arm of a pair of arms 102 secured to the stub tubings 90. One of the collars 98 is secured to the block 96, as shown in FIGURE 14, and the transverse member 95 is secured to the block 97, as shown in FIGURE 13, and to maintain the transverse member 95 in a level horizontal plane the block 97 is provided with a shim 103 between said block and the transverse member 95. The blocks 96 and 97 can also be secured on the collar 98 and the transverse member 95 to extend at inclining angles to correspond to the inclination of the stringers 18 in the same manner as the plates 35 and for the same purpose.

The end portion of the transverse member 95 supported by the block 97 is extended outside the associated stringer 18 and arranged with the collar 98 and arms 99 to support the accompanying stub tubing 90 and the arm 102, so that said connection between the transverse member and stub tubing is enclosed in the cabinet 51 which is mounted on the extending end of the transverse member 95 and the stringer 18 in the same manner as described in connection with FIGURES 1 to 9, inclusive.

The end portion of the stub tubing 90 enclosed in the cabinet 51 is provided with an arm 104 extending in alignment with the arm 102 enclosed in said cabinet. Said arm 104 is connected to a load sensing element, such as the hydraulic load cell 71 mounted on the exterior of the top wall of the cabinet 51, in the same manner as the arm 57 in FIGURES 4 and 9, and the same reference numerals indicate the same parts in FIGURE 10.

Having thus described my invention, I claim:

1. In means for suspending a scale conveyor including an endless belt having upper and lower stretches with the upper stretch carrying material, a pair of stringers parallelly spaced from each other and extended in a plane parallel to and between the planes of travel of the stretches of belt, a plurality of idlers mounted on the stringers to support the upper stretch of belt, the improvement comprising a transverse member supported on the stringers, fulcrum brackets secured to the transverse member, a tubing having two pairs of arms extending laterally in the same direction and a single arm extending laterally in the opposite direction, the first pair of arms being pivotally connected to the fulcrum brackets, an idler supported from the second pair of arms of the tubing and supporting a portion of the upper stretch of belt being weighed, an intermediate lever connected to the single arm of the tubing, and a load sensing element adjustably connected to the intermediate lever.

2. Means for suspending a scale conveyor as claimed in claim 1, wherein the intermediate lever is pivotally supported intermediate its ends, one end of the intermediate lever being connected to the single arm of the tubing and the opposite end of said intermediate lever connected to the load sensing element.

References Cited in the file of this patent

UNITED STATES PATENTS

| | | |
|---|---|---|
| 1,959,873 | Merrick | May 22, 1934 |
| 2,365,937 | Christmann | Dec. 26, 1944 |
| 2,394,593 | Christmann | Feb. 12, 1946 |